L. GOTTSCHALK, DEC'D.
E. GOTTSCHALK, ADMINISTRATRIX.
PROCESS OF SYNTHETICALLY PRODUCING RUBBER OR LIKE SUBSTANCES.
APPLICATION FILED AUG. 18, 1915.
1,323,589.
Patented Dec. 2, 1919.
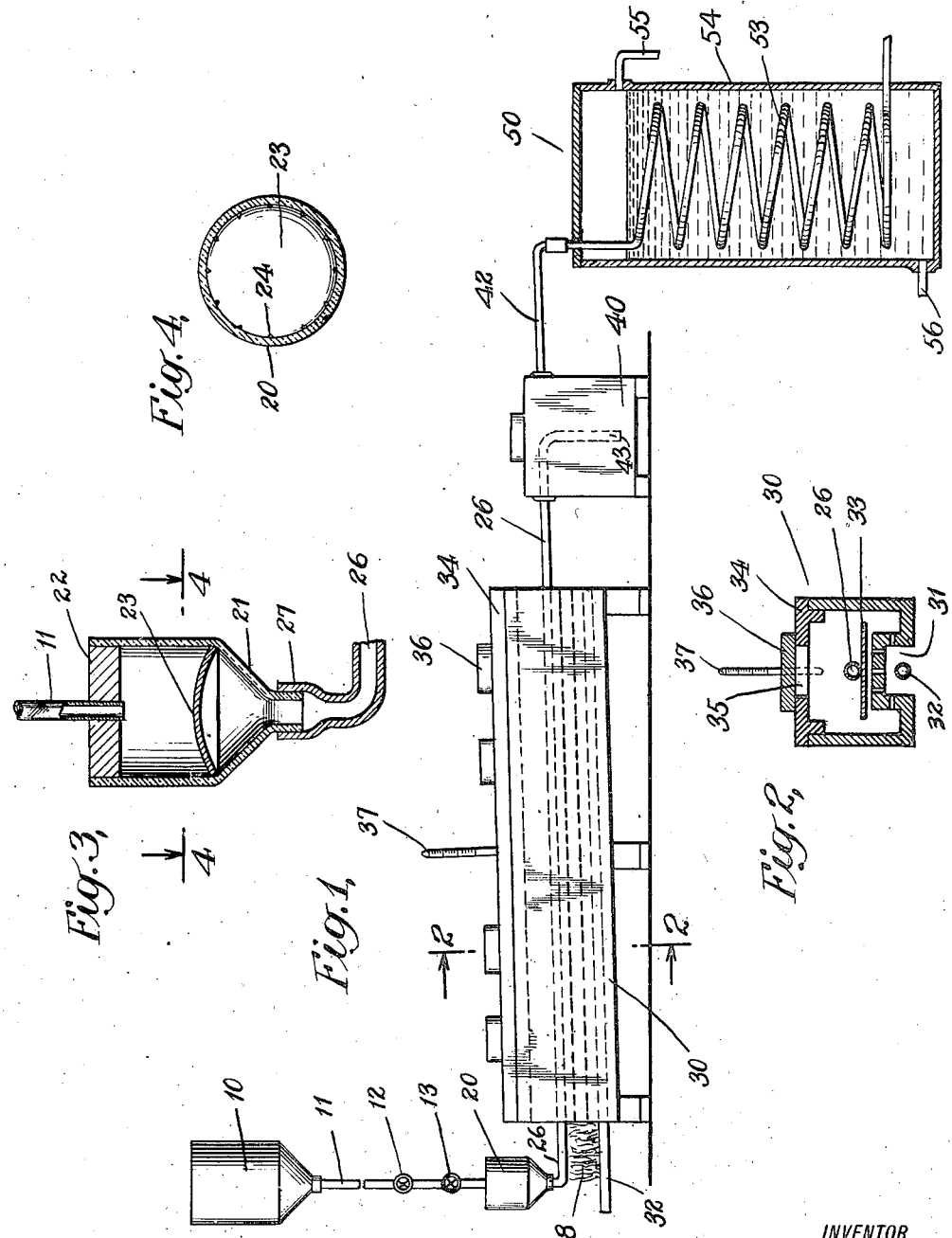

UNITED STATES PATENT OFFICE.

LOUIS GOTTSCHALK, OF RAHWAY, NEW JERSEY; ESTHER GOTTSCHALK ADMINISTRATRIX OF LOUIS GOTTSCHALK, DECEASED.

PROCESS OF SYNTHETICALLY PRODUCING RUBBER OR LIKE SUBSTANCES.

1,323,589.     Specification of Letters Patent.     Patented Dec. 2, 1919.

Application filed August 18, 1915. Serial No. 46,059.

*To all whom it may concern:*

Be it known that I, LOUIS GOTTSCHALK, a citizen of the United States of America, and a resident of Rahway, Union county, and State of New Jersey, have invented certain new and useful Improvements in Processes of Synthetically Producing Rubber or like Substances, of which the following is a specification, reference being had to the accompanying drawing, forming a part thereof.

My invention relates to processes of synthetically producing rubber or like substance and has special reference to such as involve the production of limonene.

Another object of my invention is to produce a simple and improved process by means of which rubber or like substance can be rapidly produced at a relatively small expense.

Another object is to provide simple and efficient means for changing limonene into pure rubber.

Other objects and advantages of my invention will be set forth hereinafter, and in order that my invention may be thoroughly understood I will now proceed to describe the same in the following specification and then point out the novel features thereof in appended claims.

Referring to the drawings:

Figure 1 is a partially sectional elevation of an apparatus which is adapted for use in practising my improved process.

Fig. 2 is a transverse section of the oven which forms a part of the apparatus, the section being taken on the line 2—2 of Fig. 1.

Fig. 3 is a sectional elevation of the vaporizing vessel of Fig. 1, a sectional plan view taken on the line 4—4 being shown in Fig. 4.

Corresponding parts are designated by the same reference numerals in all the figures.

The apparatus shown comprises a container 10 in which is a supply of pinene or turpentine from which the resin has been removed by steam distillation; a vaporizing vessel 20, an oven 30, a tank or cylinder 40, and a condenser 50.

The container 10 is connected by a tube 11 with the vaporizing vessel 20, the tube being provided with two valves 12 and 13 for respectively turning on or off, and regulating or controlling the rate of flow of the liquid from the container into the vaporizer.

The vaporizing vessel which, for example, may be made of glass, is cylindrical but has a funnel-shaped bottom 21, as clearly shown in Fig. 3. The tube 11 extends into the upper end of the vaporizing vessel through a cork 22 which closes the upper end of the vessel. 23 is an upwardly-curved glass disk which constitutes a baffle plate and is supported by the tapering walls of the bottom 21 at the lower end of the cylindrical portion of the vessel. Around the periphery of this disk are small cuts or notches 24.

The funnel-shaped bottom 21 extends into the end 27 of a metal tube 26, which extends through the furnace 30 in an inclined position, the vessel being connected to the lower end of the tube.

The furnace is preferably constructed with a channel 31 in its under side, in which channel is a perforated gas pipe 32. The side and top walls of this channel are perforated to allow hot burnt gases access to the inside of the furnace. Between the top wall of channel 31 and the tube 26 is a metallic baffle plate 33. The top of the furnace is closed by a cover 34 in which, at suitable intervals, are apertures 35 which are closed wholly or in part by lids 36. Thermometers 37 are also provided at intervals in the furnace cover 34.

The end of the tube 26 at the higher end of the furnace, is connected by a pipe 43 to the cylinder 40 which contains metallic sodium. The pipe 43 extends downwardly, into the cylinder 40, nearly to the bottom of the cylinder, so that the gas passes upwardly through the metallic sodium before it escapes through an outlet pipe 42 at the top of the cylinder into the condenser 50.

The metallic sodium is either broken up or melted to permit the gas to pass through it when the apparatus is first started, but it is maintained in a molten condition by the heat of the gas during the operation of the apparatus.

This condenser may be of any well known form; for example, it may comprise, as shown in Fig. 1, a coil 53 of pipe within a vessel 54 which is adapted to receive cooling fluid through an inlet 55 and discharge it through an outlet 56.

In using the above described apparatus for practising my invention, the container 10 may, for example, be filled with turpentine from which the resin has been removed. This material passes through the vaporizing vessel 20.

A flame 38 from the gas pipe 32 is allowed to play upon the end of pipe 26 which is under the vaporizing vessel and produces enough heat within the lower portion of the vessel to vaporize the turpentine. The temperature at this point is between 225 degrees and 240 degrees centigrade. The gases then pass through the tube 26 which tube is heated in the oven and the temperature thereof regulated by moving the lids 36 to cover wholly or partly the different apertures 35. In this way the heat applied to any active part of the tube 26 may be nicely regulated.

When the temperature of the gas reaches about 250 degrees centigrade all the pinene is changed into limonene. The limonene in gaseous form, then passes through the cylinder 40 and as it comes into contact with the metallic sodium contained in the cylinder, the limonene changes into rubber or a rubber-like substance. The rubber or like substance is carried by other gases or vapors formed and run through the condenser 50 from whence it emerges in the form of rubber or like solution.

This liquid may be steam distilled to remove the by-product, that is, the part of the raw material which has not been changed into rubber or a rubber-like substance. However, the process of my present invention is particularly efficient and about 95% of the limonene is changed into rubber or a rubber-like substance.

There is no appreciable effect upon the metallic sodium although it efficiently and effectively changes the limonene to rubber or a rubber-like substance, and consequently the process may be continued indefinitely.

The process of my present invention has the advantage of being more rapid and less expensive than any processes hitherto known to me.

The apparatus may obviously be modified and is shown only as one means of practising my invention. In fact, I do not intend to limit myself to the use of any particular apparatus.

What I claim is:

1. The process of changing limonene into a rubber-like substance which consists in bringing the limonene into contact with metallic sodium.

2. The process of changing limonene into a rubber-like substance which consists in bringing the limonene in vapor form into contact with hot metallic sodium.

3. The process of changing limonene into a rubber-like substance which consists in bringing the limonene in vapor form into contact with a hot alkali metal.

In witness whereof, I have hereunto set my hand this 12th day of August, 1915.

LOUIS GOTTSCHALK.